(12) United States Patent
Karjalainen et al.

(10) Patent No.: US 12,173,798 B2
(45) Date of Patent: Dec. 24, 2024

(54) SEALING ARRANGEMENT FOR DETECTING THICKNESS OF A SEALING ELEMENT OF A SEAL

(71) Applicant: ANDRITZ OY, Helsinki (FI)

(72) Inventors: Simo Karjalainen, Savonlinna (FI); Pasi Harkonen, Savonlinna (FI); Mikko Pesonen, Savonlinna (FI)

(73) Assignee: ANDRITZ OY, Helsinki (FI)

( * ) Notice: Subject to any disclaimer, the term of this patent is extended or adjusted under 35 U.S.C. 154(b) by 118 days.

(21) Appl. No.: 17/784,491

(22) PCT Filed: Dec. 10, 2020

(86) PCT No.: PCT/FI2020/050829
§ 371 (c)(1),
(2) Date: Jun. 10, 2022

(87) PCT Pub. No.: WO2021/116533
PCT Pub. Date: Jun. 17, 2021

(65) Prior Publication Data
US 2023/0034388 A1  Feb. 2, 2023

(30) Foreign Application Priority Data

Dec. 12, 2019  (FI) .................................. 20196078

(51) Int. Cl.
*F16J 15/3296*  (2016.01)
*F16J 15/3212*  (2016.01)
(Continued)

(52) U.S. Cl.
CPC ....... *F16J 15/3296* (2013.01); *F16J 15/3212* (2013.01); *G01B 7/10* (2013.01); *G01B 15/02* (2013.01)

(58) Field of Classification Search
CPC ...... F16J 15/3296; F16J 15/3212; G01B 7/10; G01B 15/02
See application file for complete search history.

(56) References Cited

U.S. PATENT DOCUMENTS 3,594,721 A * 7/1971 Frenkel ................. F16D 66/022
188/1.11 R
4,117,402 A * 9/1978 Zangger ................... G01B 7/10
324/231
(Continued)

FOREIGN PATENT DOCUMENTS

| CA | 3 083 545 | 6/2019 |
|---|---|---|
| CN | 108757945 | 11/2018 |

(Continued)

OTHER PUBLICATIONS

International Search Report for PCT/FI2020/050829, mailed Feb. 17, 2021, 3 pages.

(Continued)

*Primary Examiner* — Eugene G Byrd
(74) *Attorney, Agent, or Firm* — Nixon & Vanderhye P.C.

(57) ABSTRACT

A sealing arrangement for detecting thickness (t) of a sealing element (2) of a seal (1) wherein the sealing surface (3) at frontside of the sealing element (2) is arranged to be in sliding contact with sealed surface (4), wherein at least one sensor (5) measures the thickness of the sealing element (2) and is mounted to the surrounding component (10) of the sealed surface (4). The sensor (5) is positioned opposite the sealing element (2). The sensor (5) receives a response from a transverse border of the sealing element (2) or from an electrically conductive insert (6) or from an insert (6) of magnetic material, which insert (6) is embedded within the sealing element (2) or is connected to the backside of the (Continued)

Figure 1:
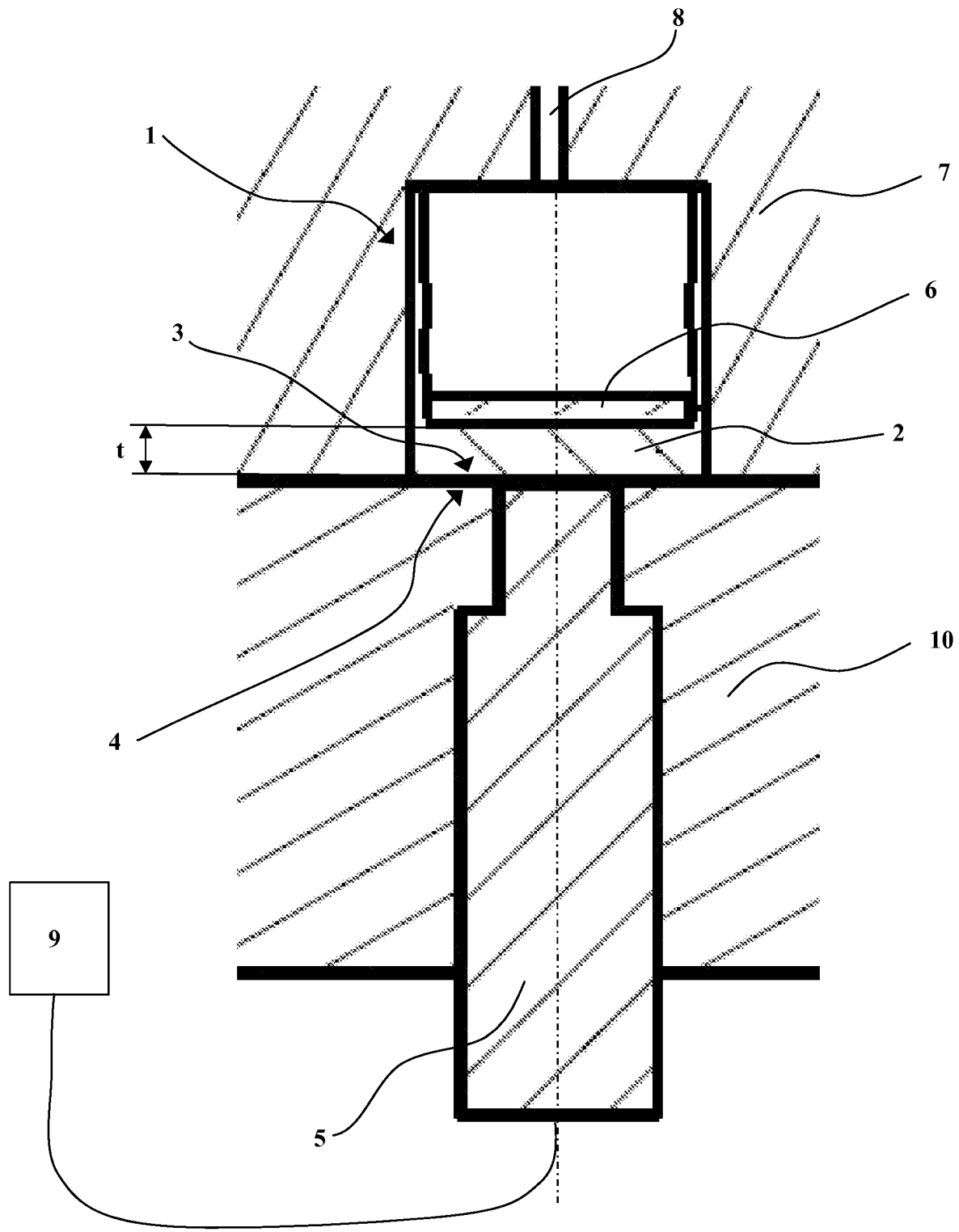

sealing element (2). The thickness (t) is detected and/or measured along the length of the sealing element (2).

21 Claims, 3 Drawing Sheets

(51) Int. Cl.
    *G01B 7/06*     (2006.01)
    *G01B 15/02*     (2006.01)

(56) References Cited

U.S. PATENT DOCUMENTS

| | | | | |
|---|---|---|---|---|
| 4,922,423 | A * | 5/1990 | Koomey | E21B 33/063 |
| | | | | 166/373 |
| 5,540,448 | A * | 7/1996 | Heinzen | F16J 15/3296 |
| | | | | 277/944 |
| 8,527,214 | B2 | 9/2013 | Horak | |
| 9,187,974 | B2 * | 11/2015 | Coonrod | G01S 7/62 |
| 9,541,199 | B2 * | 1/2017 | Rust | F16J 15/3236 |
| 9,587,461 | B1 * | 3/2017 | Jaffrey | E21B 33/06 |
| 10,161,225 | B2 * | 12/2018 | Jaffrey | G01L 1/242 |
| 10,174,577 | B2 * | 1/2019 | Leuchtenberg | E21B 33/085 |
| 2017/0009550 | A1 | 1/2017 | Leuchtenberg et al. | |
| 2017/0059042 | A1 * | 3/2017 | Withers | F16J 15/3296 |
| 2017/0321808 | A1 * | 11/2017 | Lang | G01P 15/18 |
| 2018/0112779 | A1 * | 4/2018 | Nahrwold | G01M 13/005 |
| 2018/0274682 | A1 * | 9/2018 | Shimizu | F16J 15/3296 |
| 2019/0063612 | A1 * | 2/2019 | Inagaki | F02M 26/70 |
| 2019/0072183 | A1 * | 3/2019 | Nahrwold | F16J 15/3296 |

FOREIGN PATENT DOCUMENTS

| | | | | |
|---|---|---|---|---|
| CN | 108757945 | A * | 11/2018 | F16J 15/3404 |
| DE | 102018000935 | A1 * | 5/2019 | F16J 15/02 |
| JP | 2014-74469 | | 4/2014 | |
| JP | 2021032381 | A * | 3/2021 | |

OTHER PUBLICATIONS

Written Opinion of the ISA for PCT/FI2020/050829, mailed Feb. 17, 2021, 6 pages.
Chilean Patent Application No. 1497-2022, Office Action of May 31, 2024)(16 pages).

* cited by examiner

SEALING ARRANGEMENT FOR DETECTING THICKNESS OF A SEALING ELEMENT OF A SEAL

This application is the U.S. national phase of International Application No. PCT/FI2020/050829, filed Dec. 10, 2020, which designated the U.S. and claims priority to Finnish patent application FI 20196078, filed Dec. 12, 2019, the entire contents of each of which are hereby incorporated by reference.

This invention relates to a sealing arrangement for detecting thickness of a sealing element of a seal. Preferably the seal is pressurized by a fluid or other pressing arrangement, which will ensure contact of the sealing surface of the seal with an adjacent moving sealing surface, which surfaces slide against each other on operation of the sealed components. The invention relates also to the devices processing suspensions within a pulp or paper production plant. The scope of the invention is defined in the claims.

BACKGROUND OF THE INVENTION

Sealing surfaces of seals which are in sliding contact with an adjacent sealed surface eventually wear out. Often the seals are installed to continuously operating devices, in which it is not feasible to stop for inspecting the amount of wear of the sealing surfaces. Thus, there is a strong need to measure the level of wear or at least detect when the sealing surface has been worn to a critical thickness. A variety of methods and arrangements have been developed for the measurement or indication tasks. Some do utilize visually detectable features. For those indications the seal has to be visually seen by an operator or servicemen. Very often it is not possible in practice.

Opening or closing electrical connections have also been arranged on or inside the sealing material for indicating, that the seal has worn so thin that it needs to be replaced. Patent documents like U.S. Pat. Nos. 5,540,448 and 10,161,225 describe such solutions. The seal can also be provided with embedded measuring sensors for measuring the thickness of the sealing surface of the seal at the position of the sensor. Patent documents like U.S. Pat. No. 3,594,721, US2017009550 and U.S. Pat. No. 4,922,423 describe such solutions. Patent documents US20190072183 and US20180112779 discloses use the sealed surface as a ground pole of a capacitor and a conductive insert embedded within the seal acts as the second pole. Measuring capacitance of such circuit indicates the thickness of the sealed surface.

SUMMARY OF THE INVENTION

A seal which moves against a sealed surface may wear out locally. Solutions, which use a sensing method that have embedded opening or closing connections, are able to detect a locally worn-out sealing element of a seal. They are still not able to continuously measure development of the thickness along the sealing element. Capacitive method can measure an average thickness of the sealing surface. By having knowledge how fast the seal is wearing, a controller can for example extrapolate wearing tendency and predict available operating time before the seal should be changed. Also, by measuring whole or most of the length of the seal, any faster wearing locations can be detected and followed up.

Any sealed surface, which slides against the sealing element, should be as uniform as possible for avoiding any irregularities of the surface, which can accelerate wearing. Also, the material of the sealed surface should be uniform for avoiding localized difference in wear rate. For example, variation of hardness or metallurgical composition or surface irregularity may result in completely different wear rates or local corrosion along the sealed surface. The sealed surface should preferably comprise only one component for avoiding any boundaries within the sealed surface. Such boundaries may cause leaking even with a new seal.

The present invention is developed for addressing the needs for follow-up of wear of sealing elements of seals, which are in sliding contact with adjacent sealed surface.

When at least one sensor for detecting the thickness of the sealing element of a seal is mounted to the surrounding component of the sealed surface and the sensor is positioned opposite to the sealing element, the sensor can detect and/or measure the thickness along the length of the sealing element. When the surrounding component of the sealed surface and/or the component wherein the seal is mounted rotates or reciprocates, i.e. they are arranged to move in respect of each other in the longitudinal direction of the sealing element, the sensor will continuously stay opposite to the sealed surface. The sensor should be capable for receiving a response from a transverse border of the sealing element or from an insert. The insert may be electrically conductive or of magnetic material. The insert may be embedded within the sealing element or be connected to the backside of the sealing element.

No extra wear of the sealing element has detected in tests, even though the sensor has been in contact with it through a hole within the sealed surface. Nor it was found any relevant difference in wear of the sealed surface when the sealing arrangement was surrounded with lignocellulosic or other suspensions of a pulp or paper production plant even though the material of the sealed surface and the sensor were different from each other. As a seal may seal against any fluids or substances comprising particles, same positive results do not necessary apply to other untested sealing arrangements and environments. Still, with a continuously operating process devices like those used for lignocellulosic or other suspensions of a pulp or paper production plant, it is often preferred to have a controlled but a bit shorter lifetime than an assumed but uncontrolled longer lifetime.

The sensor is preferably an ultrasonic sensor. Alternatively, it is sensitive to changes of inductance or magnetic field. The seal may have an insert within the seal at backside of the sealing element or the insert is embedded within the sealing element, if the sensing method of the sensor requires or prefers it. The insert or the sealing element then comprises metal or other electrically conductive material or magnetic material. Electrically conductive fluid within the backside of the sealing element can also act as an insert and enable the operation of the sensor.

Advantageously width or diameter of sensing end of a sensor is less than the width of the sealing surface contacting the sealed surface, if the sensing end of the sensor is in a hole of the sealed surface. Then a part of the sealing surface is not affected by possible discontinuities formed between the sensing end of the sensor and the sealed surface. If the sensor is also centered in respect with the sealing element, a uniform area of sealed surface will exist at both sides of the sensing end of the sensor. If the sensor is centered in respect with the insert, the arrangement achieves best sensing results. To achieve sufficiently uniform sealed surface, the height of the sensing end of the sensor should be less than 0.1 mm over the sealed surface and less than 0.2 mm below the sealed surface. More preferably, they are at equal level. Most preferably, the whole sealed surface is uniform and the sensor is mounted under the sealed surface. Then no contact happens with the sensor and the sealing element.

A pressing force should press the sealing element along the whole length of the seal against the sealed surface. The pressing force may be accomplished by pneumatic, hydraulic or mechanical means. Preferably, the backside of the sealing element is connected via a conduit to a source of pressurized fluid.

For achieving informative and process controlling advantages, the sensor should be connected to a controller of the device wherein the seal is mounted. The controller should be configured to report the minimum thickness of the sealing element and/or at least indicate when a measured value and/or a signal received from the sensor indicates that the thickness is thinner than a predetermined limit at any longitudinal location of the sealing element. Preferably the controller is also configured to report the thickness of the sealing element related to angular or longitudinal locations of the sealing element. If the connection between the sensor and the controller is wireless and they are battery operated, the connection and/or the sensor should not operate continuously as power saving periodical operation is required.

LIST OF DRAWINGS

Figure 2:
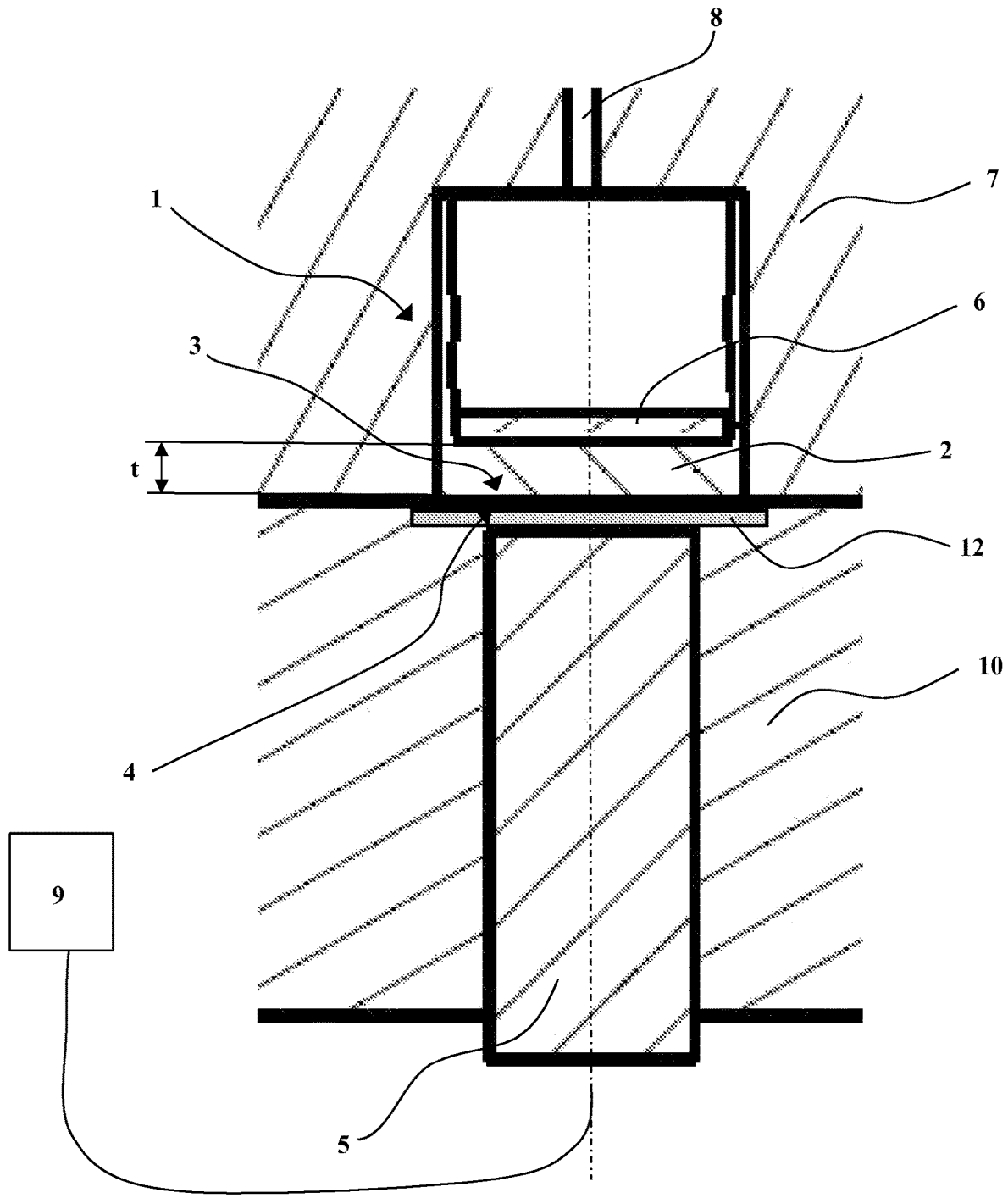
Figure 3:
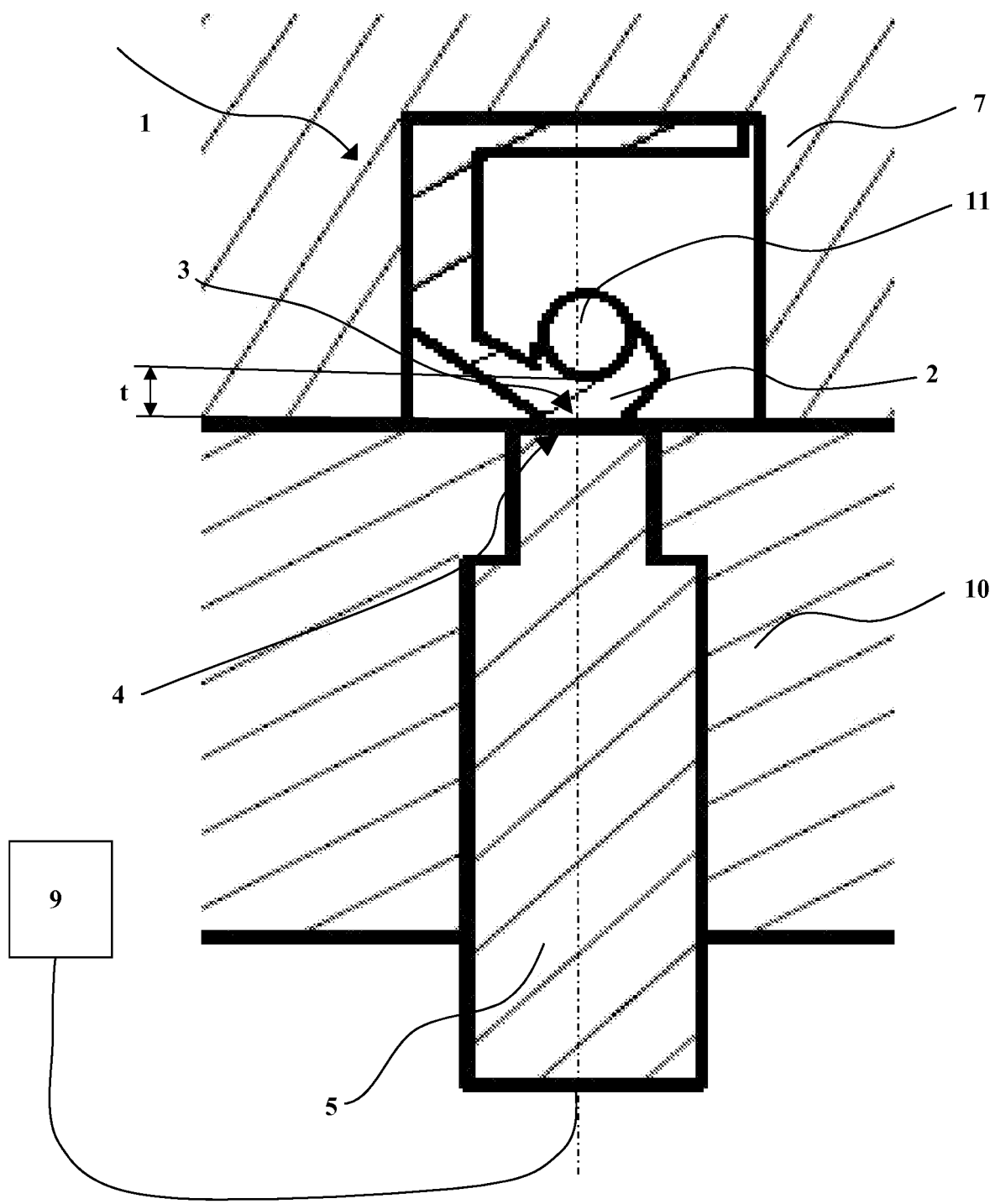

FIG. 1 illustrates an embodiment of the invention wherein a seal is pressurized, FIG. 2 illustrates an embodiment of the invention, wherein the sensor is attached under the sealed surface and FIG. 3 illustrates an embodiment of the invention wherein force for pressing a seal is arranged by a spring.

DETAILED DESCRIPTION OF THE INVENTION

FIG. 1. Illustrates an embodiment of a sealing arrangement for detecting thickness t of a sealing element 2 of a seal 1. Sealing surface 3 at frontside of the sealing element 2 wears and gets thinner when it is in sliding contact with adjacent sealed surface 4 of surrounding component 10. The sealing element 2 of the seal is the acting element, which restricts leaking between the sealing surface 3 and the sealed surface 4. The other parts of the sealing arrangement are mainly for preventing leaking between the seal 1 and or the component 7 wherein the seal 1 is mounted and for ensuring continuous acting force to the sealing surface 3.

At least one sensor 5 for indicating the thickness of the sealing element 2 is mounted to the surrounding component 10 of the sealed surface 4. The surrounding component 10 of the sealed surface 4 and/or the component 7 wherein the seal 1 is mounted is arranged to reciprocate or to rotate in the longitudinal direction of the sealing element 2, so that the sensor 5 is continuously positioned opposite to the sealing element 2. The sensor 5 is preferably connected to a controller 9 of the device, wherein the seal 1 is mounted. The sensor 5 may also be connected to needed indicative controllers and indicators for acting as a stand-alone solution. The controller 9 is configured to report the status of thickness t of the sealing element 2. Preferably, the controller 9 at least reports that the thickness t is too thin, when a value and/or a corresponding signal received from the sensor 5 indicates that the thickness t is thinner than a predetermined value at any longitudinal location of the sealing element 2. More preferably the controller 9 is configured to report the thickness t of the sealing element 2 related to angular or longitudinal locations of the sealing element 2 at predetermined time intervals.

If the surrounding component 10 and thus the sealed surface 4 are rotatable, a wireless connection like Bluetooth, WLAN, RFID or other radio, sound or light wave transmitting means may be needed to connect the sensor 5 and the controller 9. The wireless transmitting can be continuous or the transmitter may transmit collected data at suitable intervals like daily or weekly for saving battery power. A preferred interval is longer than one hour and a more preferable interval is daily. The sensor and sensor data processing and storing may also be operated at the same or shorter intervals for saving battery power. The wearing should not happen fast at least when processing lignocellulosic or other suspensions of a pulp or paper processing plant. A seal should not wear out to too thin thickness within days. Normally the devices with such seals should operate continuously preferably longer than one year without changing the seals. For example, many commercial small sensor devices, which have a Bluetooth connection, are able to operate years without changing batteries, if they are not continuously operated.

If the sensor 5 is an ultrasonic sensor, it transmits ultrasonic sound against and through the sealing element 2. When the sound hits a transverse harder barrier like an insert or other border like backside of the sealing element 2, it will echo back. A receiver of the sensor 5 detects time difference between the echo and the sent sound. The sound should be directed to transverse direction of the sealed surface 4. The time difference is proportional with the thickness of the sealing element 2. An ultrasonic sensor does not need to extend through the component 10 up to the sealed surface 4 as the sound will penetrate through metallic materials easily without relevant dampening. The sealed surface 4 can stay uniform and the sensor 5 is attached to the surrounding component 10 and directs the ultrasonic sound to the sealed surface 4 and to the sealing element 2. The indicated echo from the interface between the sealed surface and the sealing element 2 will have a constant time difference and will be filtered out of reported indications. As the sealing material is normally soft and do not conduct sound well, a harder insert 6 embedded within or attached to the backside of the sealing element 2 can enhance the echoing capability and enable more reliable measurement results. The ultrasonic sensing method is also able to measure thickness of a sealing element 2, which is made of metal or other conductive material.

Another advantageous and reliable type of sensor 5 is sensitive to changes of inductance and preferably the sensor 5 is a proximity sensor. A proximity sensor is configured to detect and signal presence of an object and preferably distance to it. When a metallic or other electrically conductive material is positioned close to the coil of the proximity sensor, it senses changes of inductance of the coil. The change of inductance is proportional with the thickness t of the sealing element 2. The proximity sensor or a controller connected to it may signal a numeric or analog value relating to the distance. It may also or instead change status of a switch or send a signal, if a close object has been detected. For the detection and/or measuring purposes, the detected object needs to be electrically conductive. As the sealing elements 2 normally are not conductive, an insert 6 or the sealing element 2 should comprise metal or other electrically conductive material. The insert 6 has to move closer to the sealed surface 4 when the sealing element 2 gets thinner, so it is preferably attached or linked to the backside of the sealing element 2. A wire, a foil, particles or other types of conductive inserts 6 may also be embedded within the sealing element 2. Electrically conductive fluid at the backside of the sealing element 2 can also induce the needed detection. A proximity sensor will operate best, if it is mounted so that the sensing end of the sensor is in a hole of the sealed surface 4. The proximity sensor may also operate adequately, if the metallic sealed surface is as thin as possibly over the sensing end. If the sealed surface 4 is not electrically conductive, there is no need to have a hole in the sealed surface for the proximity sensor. For example, a strip or sheath of PTFE or a coating of durable low friction material can be mounted on the surrounding component 10 and the sealed surface 2 will be on the strip or sheath or coating. The proximity sensor or other type of sensor 5 can be mounted under it and still achieve reliable sensitivity. A sensor 5 may also detect the change of thickness t by change of magnetic field. The arrangement can comprise for example an insert 6 or the sealing element 2, which comprise magnetic material. Thus the sensor 5 will detect increased magnetic field when the sealing element 2 gets thinner. Advantageously width or diameter of a preferably flat sensing end of the sensor 5 is less than width of the sealing surface 3, if the sensor 5 has a sensing end attached into a hole of the sealed surface 4. Preferably, the sensor 5 is centered in respect with the sealing element 2 and/or the insert 6. The sealed surface 4 should be smooth without irregularities. Thus, the height of the sensing end of the sensor 5 should be less than 0.1 mm over the sealed surface 4 and less than 0.2 mm below the sealed surface 4. Most advantageously, the sensor 5 is mounted under the sealed surface 4.

A sensor 5 may also detect the change of thickness t by change of magnetic field. The arrangement can comprise for example an insert 6 or the sealing element 2, which comprise magnetic material. Thus the sensor 5 will detect increased magnetic field when the sealing element 2 gets thinner.

Advantageously width or diameter of a preferably flat sensing end of the sensor 5 is less than width of the sealing surface 3, if the sensor 5 has a sensing end attached into a hole of the sealed surface 4. Preferably, the sensor 5 is centered in respect with the sealing element 2 and/or the insert 6. The sealed surface 4 should be smooth without irregularities. Thus, the height of the sensing end of the sensor 5 should be less than 0.1 mm over the sealed surface 4 and less than 0.2 mm below the sealed surface 4. Most advantageously, the sensor 5 is mounted under the sealed surface 4.

Pressurizing the seal is a fine and adaptive way for achieving constant acting force for the sealing element 2. Then the backside of the sealing element 2 is connected via a conduit 8 to a source of pressurized fluid. Even though the specified features disclosed with the embodiment of FIG. 1, implementing them is not restricted to pressurized seals. Any other ways for ensuring suitable acting force to sealing element 2 are possible with the advantageous features.

FIG. 2 illustrates an embodiment of the invention, wherein the sensor 5 is attached under the sealed surface 4. The sensor 5 may or may not be covered by a replaceable or fixed sheath 12 of for example plastic or metallic material. Especially an ultrasonic sensor 5 may also be attached without any cavity for it to the backside of the surrounding component 10 to a position opposite to the sealing element 2.

FIG. 3 illustrates an embodiment of the invention, wherein acting force for the sealing element is arranged by a spring 11. The spring 11, which has a flat base and/or a metallic washer under it, will act like the insert 6 at FIG. 1 and enable thickness measuring indication for proximity or ultrasonic sensors.

The invention claimed is:

1. A sealing arrangement configured to detect a thickness of a sealing element of a seal within a recess in a component, wherein a sealing surface at a front side of the sealing element is arranged to be in sliding contact with a sealed surface of a surrounding component surrounding and adjacent the component,
    wherein the seal is mounted to move relative to and in sliding contact with the surrounding component,
    wherein the seal spans a gap between the component and the surrounding component;
    wherein a sensor is configured to measure the thickness of the sealing element,
    wherein the thickness of the sealing element is a dimension of the sealing element from the front side of the sealing element in sliding contact to the surrounding component to a backside of the sealing element opposite to the front side;
    wherein the sensor is mounted in the surrounding component,
    wherein the sensor is positioned opposite to the sealing element during the detection of thickness of the sealing element,
    wherein the sensor is configured to determine a first distance indicative of a distance from the front side to the backside of the sealing element, or determine a second distance indicative of a distance from the front side to an insert abutting the backside of the sealing element while the insert is in the recess of the component, and
    wherein the sensor measures the thickness of the sealing element based on the first distance or the second distance.

2. The sealing arrangement of claim 1, wherein the sensor is an ultrasonic sensor that transmits ultrasonic energy into the sealing element and detects reflections of the ultrasonic energy, wherein the reflections are from the insert of a portion of the first element abutting the backside of the sealing element.

3. The sealing arrangement of claim 1, wherein the insert comprises metal or other electrically conductive material or the insert is a harder material than the sealing element.

4. The sealing arrangement of claim 1, wherein the sensor is configured to detect magnetic materials and the insert comprises a magnetic material.

5. The sealing arrangement of claim 1, wherein the sensor is centered with respect to the sealing element and/or the insert.

6. The sealing arrangement of claim 1, wherein a sensing end of the sensor is mounted in a hole of the sealed surface.

7. The sealing arrangement of claim 6, wherein a width or a diameter of the sensing end of the sensor is less than a width of the sealing surface.

8. The sealing arrangement of claim 6, wherein the sensing end of the sensor is positioned related to the sealed surface in a range of 0.1 mm above the sealed surface and 0.2 mm below the sealed surface.

9. The sealing arrangement claim 1, wherein the sensor is under the sealed surface and attached to the surrounding component.

10. The sealing arrangement of claim 1, wherein the backside of the sealing element is connected via a conduit to a source of pressurized fluid.

11. The sealing arrangement of claim 1, wherein at the sealing element includes a chamber having a front open to the sealed surface and in fluid communication with a source of an electrically conductive fluid.

12. The sealing arrangement of claim 1, wherein the sensor is connected to a controller of the device, and the controller is configured to report the thickness of the sealing element, at least when a value and/or a corresponding signal received from the sensor indicates that the thickness is thinner than a predetermined value at any longitudinal location of the sealing element.

13. The sealing arrangement of claim 12, wherein the controller is configured to periodically report the thickness of the sealing element related to angular or longitudinal locations of the sealing element.

14. The sealing arrangement of claim 12, wherein the sensor is activated for detection of the thickness and is configured to wirelessly transmit data indicating the thickness to the controller at periods greater than an hour.

15. A device for processing lignocellulosic or other suspension of a pulp or paper production plant, which device has the sealing arrangement of claim 1.

16. A sealing arrangement comprising:
a first component having a first surface and a recess within the first surface;
a second component having a second surface facing the first surface, wherein the second component and the second surface move relative to the first component and the first surface along a movement direction;
a sealing element seated in the recess of the first component and having a first width along a direction orthogonal to the movement direction, wherein the sealing element spans a gap between the first surface and the second surface, and the sealing element has a first sealing surface is in sliding engagement with the second surface across the first width of the sealing element and a second surface opposite the first surface and within the recess; and
a sensor embedded in the second surface and having a sensing surface facing the first sealing surface, a width or diameter of the sensing surface, along the direction orthogonal to the movement direction, is narrower than the first width such that portions of the first width of the sealing element extend beyond the sensing surface along the direction orthogonal to the movement direction,
wherein the sensor is configured to determine a thickness of the of the sealing element,
wherein the thickness is along a direction orthogonal to the movement direction and to the first width and the thickness extends from the first sealing surface to the second surface of the sealing element,
wherein the sensor is configured to determine a first distance indicative of a distance from the first surface to the second surface of the sealing element abutting the component or determine a second distance indicative of a distance from the first surface to an insert abutting the second surface while the insert is in the recess of the component, and
wherein the sensor is configured to determine the thickness of the seal based on the first distance or the second distance.

17. The sealing arrangement of claim 16, wherein the thickness of the sealing element is a distance between the insert and the first sealing surface, and wherein the sensor is configured to detect the thickness by detecting a position of the insert relative to the sensing surface.

18. The sealing arrangement of claim 17, wherein the insert is at least one of a magnetic material, a conductive material and a material having a hardness greater than a hardness of the sealing element.

19. The sealing arrangement of claim 16, further comprising a controller configured to wirelessly from the sensor data indicative of the thickness from the sensor and generate a report indicating the thickness.

20. A method of monitoring sealing arrangement comprising:
sealing with a sealing element a gap between a first surface of a first component and a second surface of a second component moving along a movement direction relative to the first component, wherein the sealing element is seated in a recess in the first surface of the first component, wherein the sealing element has includes a first width along a direction orthogonal to the movement direction, the sealing element spans the gap, and the sealing element includes a first sealing surface and a second surface on a side of the sealing element opposite to the first sealing surface, wherein the first sealing surface is in sliding engagement along the movement direction with the second surface across the first width of the sealing element and the second surface is in the recess and abut the first component or the second surface abuts an insert in the recess;
repeatedly determining a thickness of the sealing element along an entire length of the sealing element using a sensor embedded in the second surface and having a sensing surface facing the first sealing surface, a width or diameter of the sensing surface, along the direction orthogonal to the movement direction, is narrower than the first width such that portions of the first width extend beyond the sensing surface along the direction orthogonal to the movement direction, wherein the thickness is along a direction orthogonal to the movement direction and to the first width and the thickness extends from the first sealing surface to the second surface, wherein the determining includes determining a distance indicative a distance from the first sealing surface to the second surface of the sealing element abutting the component or a distance indicative of a distance from the first sealing surface to an insert abutting the second surface while the insert is in the recess of the component, and
periodically reporting a thickness value indicative of the sensed thickness along the entire length of the sealing element.

21. The method of claim 20, wherein the movement direction is circular about an axis common to the first component and the second component, the step of repeatedly sensing the thickness of the sealing element is preformed during relative rotational movement of the first component or the second component.

* * * * *